United States Patent [19]

Kurata et al.

[11] Patent Number: 4,849,825
[45] Date of Patent: Jul. 18, 1989

[54] PICK-UP DEVICE FOR USE IN AN OPTICAL INFORMATION RECORDING SYSTEM

[75] Inventors: Yukio Kurata; Hideaki Sato; Yasuo Nakata; Nobuo Ogata, all of Tenri; Teruaki Inoue, Nara, all of Japan

[73] Assignee: Sharp Kabushiki Kaisha, Osaka, Japan

[21] Appl. No.: 928,395

[22] Filed: Nov. 10, 1986

[30] Foreign Application Priority Data

Nov. 11, 1985 [JP] Japan .................. 60-254483
Dec. 18, 1985 [JP] Japan .................. 60-285960

[51] Int. Cl.[4] .............................................. G11B 7/12
[52] U.S. Cl. ...................................... 358/296; 369/100
[58] Field of Search ................. 358/296; 346/160, 108; 350/3.7, 3.73, 169, 162.11, 162.22, 162.17; 369/100

[56] References Cited

U.S. PATENT DOCUMENTS

| | | | |
|---|---|---|---|
| 3,680,945 | 8/1972 | Sheridan | 350/162.22 |
| 4,403,318 | 9/1963 | Nagashima et al. | 369/100 |
| 4,484,072 | 11/1984 | Matsumura | 350/162.22 |
| 4,624,526 | 11/1986 | Tsukai et al. | 350/162.17 |
| 4,665,310 | 5/1987 | Heemskerk | 250/201 |

FOREIGN PATENT DOCUMENTS 0147749  7/1985  European Pat. Off. .
3522849  1/1986  Fed. Rep. of Germany .

OTHER PUBLICATIONS

Published Japanese Abstract for Japanese Patent No. 60-182526, vol. 10, No. 34, (P-427) (2091).

Primary Examiner—Clifford C. Shaw
Attorney, Agent, or Firm—Birch, Stewart, Kolasch & Birch

[57] ABSTRACT

A pick-up device which includes a light source and a condenser lens for effecting recording and reproduction of information by projecting a light beam as collected by the condenser lens onto a recording medium. A diffraction grating is provided between the light source and the condenser lens for dividing light returning from the recording medium by a diffraction grating so as to be directed to a photo-detector, to thereby obtain an optical detection signal.

3 Claims, 3 Drawing Sheets

PICK-UP DEVICE FOR USE IN AN OPTICAL INFORMATION RECORDING SYSTEM

BACKGROUND OF THE INVENTION

The present invention generally relates to a pick-up arrangement and more particularly, to a pick-up device suitable for use in an optical disc apparatus such as a so-called compact disc player, video disc player or the like.

Commonly, an optical disc apparatus is arranged so as to effect recording by forming fine holes or grooves in a spiral or concentric pattern on the surface of a disc-like recording medium or by subjecting the surface of the recording medium to magnetic variations, and also to effect reproduction by projecting a collected spot light onto the recorded portion of the recording medium so as to derive the reflected light or transmitted light as reproduction information.

In FIG. 1, there is shown a general construction of a conventional optical information reading pick-up device as incorporated in an optical disc apparatus.

In the known pick-up device as shown in FIG. 1, the optical system includes a collimate lens Lm and a beam splitter Sp provided in a barrel Br so as to collect and project laser light emitted from a semi-conductor laser W onto a recording medium M through said collimate lens Lm, said beam splitter Sp and an objective lens Lo. After being subjected to modulation at the information recorded portion on the recording medium M, the light thus projected is divided by the beam splitter Sp through the objective lens Lo, and one portion of the divided light is incident upon a photo-detector Pd via a detecting system convex lens Ld and a cylindrical lens Lc.

In the conventional optical information reading pick-up device having the optical system as described above, in order to correctly record the information on the recording medium or so as to accurately reproduce the recorded information therefrom, it is necessary to control in such a manner that the collected light spot correctly traces the information portion (referred to as tracking) as recorded in the sprial or concentric configuration (i.e. information recorded track), with a simultaneous control for focusing of the light spot.

Moreover, for the actual application, since the above pick-up device is subjected to influences due to eccentricity or fluttering of the disc, and external vibrations, etc., it is required to provide a mechanism to derive such deviations as error signals for automatic correction. For this purpose, it has been a normal practice to effect the focus control and the tracking control through employment of an electromagnet driving unit including a magnetic circuit and a coil means. For effecting control up to the high frequency region during the above tracking driving, it is desirable that the driving portion is compact in size and light in weight.

From the above point of view, there has also been conventionally proposed an arrangement in which only the objective lens Lo is separated from the barrel for driving, but in such a construction, deviation in axes is produced between an optical axis of the pick-up and that of the objective lens, thus resulting in deterioration in the quality of the pick-up control signal, for which some countermeasures are required. Furthermore, in order to avoid the deterioration in the recording signal and reproducing signal with respect to the disc, a driving unit having a sufficiently high accuracy is required so as to prevent inclination of the lens optical axis from taking place during driving of the objective lens. Meanwhile, in the pick-up device as shown in FIG. 1, in which the whole pick-up assembly is driven, cross-talk between the tracking control and the focus control tends to take place since the barrel Br is not formed with axial symmetry. More specifically, on the assumption that the pick-up is driven in a direction at right angles with the recorded surface of an information carrier or recording medium having a disk-like shape, a phenomenon where the optical axis deviates from the direction normal to the recorded surface, is difficult to avoid when a pick-up device is used which does not have axial symmetry.

Additionally, in the prior art pick-up device as shown in FIG. 1, the astigmatism producing optical system including the convex lens Ld and the cylindrical lens Lc is required to obtain the focusing error signal for effecting the focus control. However, such an optical system becomes an obstruction in realizing the reduction of size, weight and cost for the pick-up device.

SUMMARY OF THE INVENTION

Accordingly, an essential object of the present invention is to provide an improved pick-up device for use in an optical disc apparatus or the like, which has a symmetrical construction, and is compact in size and light in weight, with a reduced number of parts involved, and which can be readily manufactured at low cost.

Another important object of the present invention is to provide a pick-up device of the above described type, which is arranged to suppress the undesirable cross-talk phenomenon by imparting a blaze characteristic in a diffracting direction of the diffraction grating.

In accomplishing these and other objects, according to one preferred embodiment of the present invention, there is provided a pick-up device which includes a light source and a condenser lens for effecting recording and reproduction of information by projecting a light beam as collected by the condenser lens onto a recording medium, wherein there is further provided a diffraction grating between the light source and the condenser lens for dividing light returning from the recording medium by the diffraction grating so as to be directed to a photo-detector, thereby to obtain an optical detection signal.

By the above arrangement of the present invention, an improved pick-up device has been advantageously provided, with substantial elimination of disadvantages inherent in the conventional pick-up devices of this kind.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
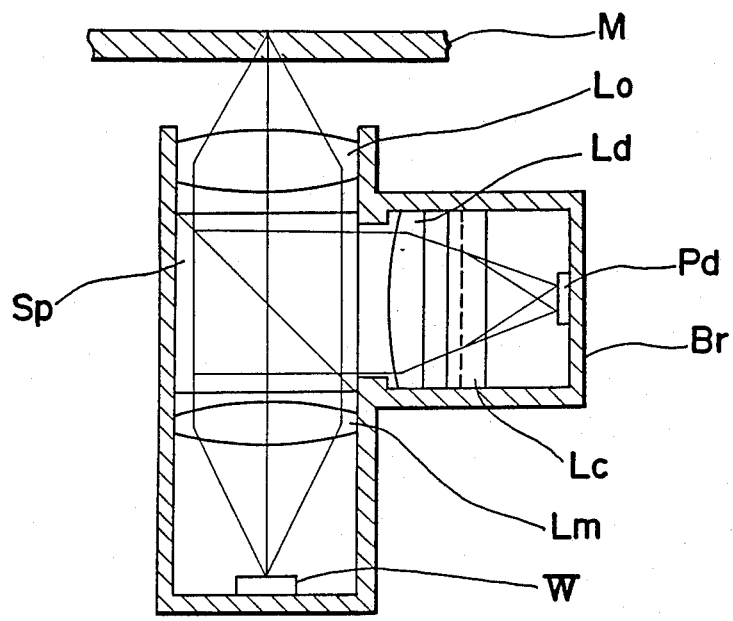
FIG. 1 is a schematic side sectional view showing a general construction of a conventional optical information reading pick-up device which may be incorporated in an optical disc apparatus (already referred to)

Before the description of the present invention proceeds, it is to be noted that like parts are designated by like reference numerals throughout the accompanying drawings.

Figure 2:
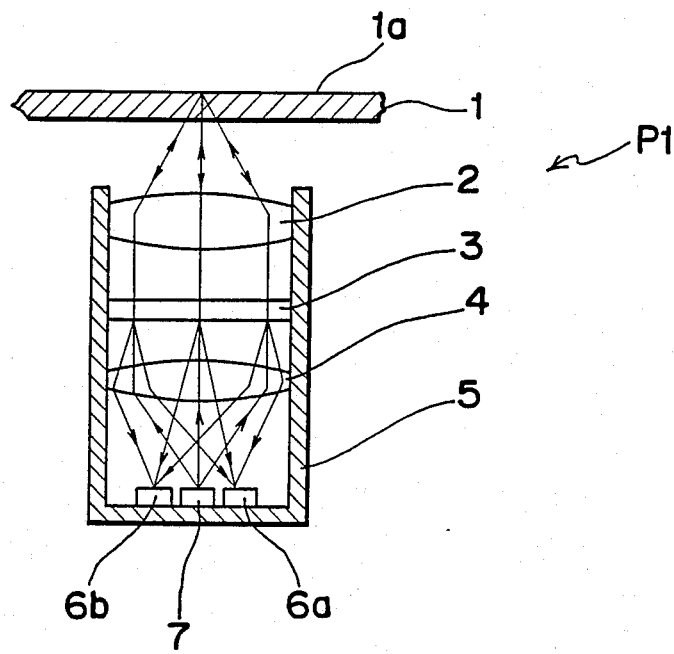
FIG. 2 is a schematic side sectional view showing construction of an improved optical information reading pick-up device according to one preferred embodiment of the present invention.

Referring now to the drawings, there is shown in FIG. 2, an improved pick-up device P1 according to one preferred embodiment of the present invention.

The pick-up device P1 in FIG. 2 generally includes a barrel 5 extending in a direction intersecting at right angles with a recording surface 1a of a recording carrier or medium 1, and an objective lens 2, a diffraction grating 3, a collimate lens 4, and a semi-conductor laser or laser diode 7 provided between photo-detector 6a an 6b sequentially disposed within the barrel 5 in the above order in a direction away from the recording medium 1.

In the pick-up device P1 as described above, after being subjected to collimation by the collimate lens 4, light emitted from the semi-conductor laser 7 is transmitted through the diffraction grating 3, and thereafter, advances in a direction in which zero-order light intersects at right angles with the recording surface 1a of the recording medium 1 so as to be subsequently collected by the condenser lens 2 for being projected onto the recording surface 1a. The light thus projected is modulated at the recorded information portion on the recording medium 1, and after being collected by the objective lens 2, subjected to diffraction by the diffraction grating 3. The light thus diffracted by the diffraction grating 3 is collected onto the detectors 6a and 6b by the collimate lens 4, and thus, its becomes possible to reproduce the information recorded on the recording medium 1.

As is seen from the above description, according to the arrangement of the present invention, it becomes possible not only to realize the symmetrical nature of the pick-up, but also to reduce the size, weight and cost for the pick-up device.

Subsequently, means for detecting a focusing error signal which may be incorporated in the arrangement of FIG. 2 will be described hereinbelow.

Figure 4:
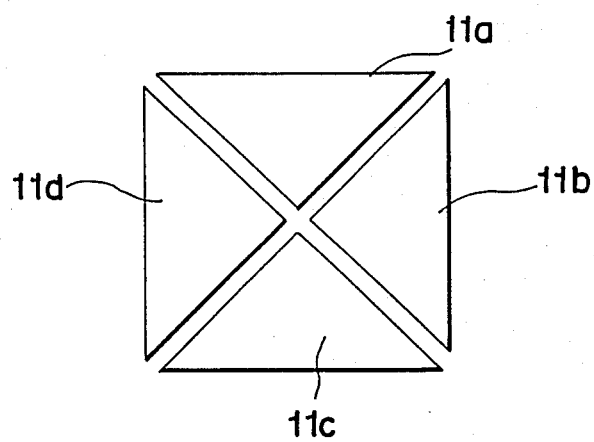
FIG. 4 is a top plan view of a quartered photo-detecting elements to be employed in the arrangement of FIG. 2 as detectors.
Figure 3:
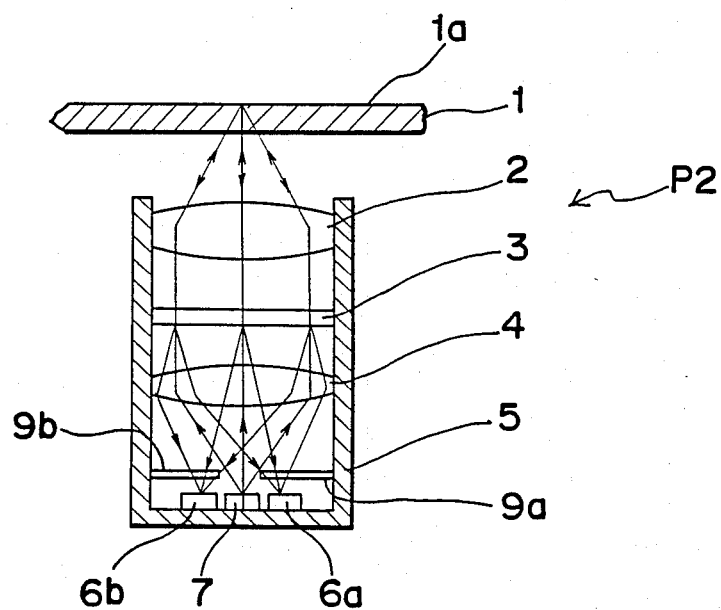
FIG. 3 is a view similar to FIG. 2, which particularly shows an arrangement in which cylindrical lenses are further included between a collimate lens and optical detectors for detection of a focusing error signal.

Since the pick-up device P1 shown in FIG. 2 is compact in size and light in weight, detection of the focusing error signal can be readily effected by the so-called wobbling method. However, for the simplification of a pick-up control electronic circuit, it is desirable to optically obtain the focusing error signal. For this purpose, a pick-up device P2 in FIG. 3 may be used. In this device, cylindrical lens 9a and 9b are disposed in a space between the collimate lens 4 and the photo-detectors 6a and 6b within the barrel 5. For a further simplification of the construction, the detectors 6a and 6b may be replaced by quartered photo-detectors 11a, 11b, 11c and 11d for astigmatism detection as illustrated in FIG. 4 so as to positively utilize the astigmatism produced by the diffraction of the diffraction grating 3. Although not particularly shown, the arrangement may be further modified, for example, by limiting a distance between the object point and image point as an objective lens to allow the elimination of the collimate lens 4 from the pick-up device, thereby utilizing light incident upon the diffraction grating 3 as focusing light. By such a arrangement, light diffracted in the direction of the detectors 6a and 6b becomes the light having astigmatism, thus making it possible to effect the focusing error detection by the astigmatic method.

As is seen from the foregoing description, according to the present invention, the improved pick-up device having the symmetrical nature in the stucture, and compact in size and light in weight may be realized through simple construction, and consequently, improvement in performance of the optical disc system employing such pick-up device can be achieved.

Figure 5:
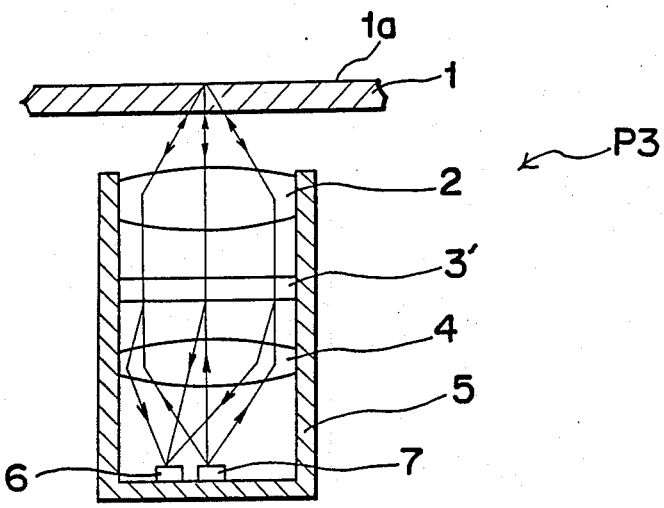
FIG. 5 is a view similar to FIG. 2, which particularly shows a modification thereof.
Figure 6:
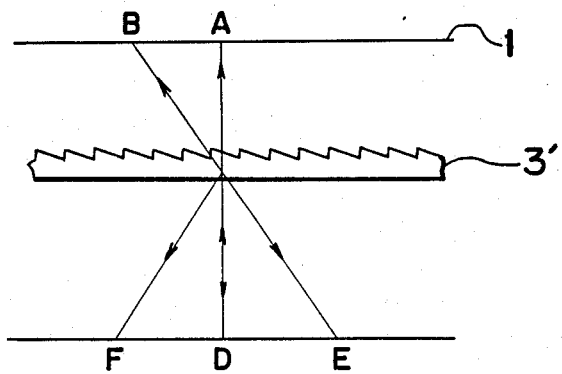
FIG. 6 is a diagram schematically showing construction of the pick-up device of FIG. 5 having a blaze characteristic.

Referring further to FIGS. 5 and 6, there is shown in FIG. 5 a modification of the pick-up device P1 of FIG. 2, while FIG. 6 shows a schematic diagram of the arrangement of FIG. 5. In the modified pick-up device P3 in FIG. 5, like parts in the pick-up device P1 in FIG. 2 are designated by like reference numerals for brevity of description.

Generally, in the similar manner as in the arrangement of FIG. 2, the pick-up device P3 in FIG. 5. includes the barrel 5 extending in a direction intersecting at right angles with the recording surface 1a of the recording medium 1, and the objective lens 2, diffraction grating 3', collimate lens 4, and semi-conductor laser or laser diode 7 provided at one side of the detector 6 sequentially disposed within the barrel 5 in the above order in a direction away from the recording medium 1.

In the pick-up device P3 as described above, after being subjected to collimation by the collimate lens 4, the light emitted from the semi-conductor laser 7 is transmitted through the diffraction grating 3', and thereafter, advances in a direction in which zero-order light intersects at right angles with the recording surface 1a of the recording medium 1 so as to be subsequently collected by the condenser lens 2 for being projected onto the recording surface 1a. The light thus projected is modulated by the recorded information portion on the recording medium 1, and after being collected by the objective lens 2, is subjected to diffraction by the diffraction grating 3'. The light thus diffracted by the diffraction grating 3' is collected onto the detector 6 by the collimate lens 4, and thus, it becomes possible to reproduce the information recorded on the recording medium 1.

It should be noted here that a major difference between the pick-up device P3 in FIG. 5 and the pick-up device P1 of FIG. 2 resides in the construction of the diffraction grating as described hereinbelow.

More specifically, in the pick-up device P3, the diffraction grating is constructed so as to have a blaze characteristic, and FIG. 6 shows the construction of the diffraction grating 3' provided with the blaze characteristic, and applicable to the arrangement of FIG. 5.

Figure 7:
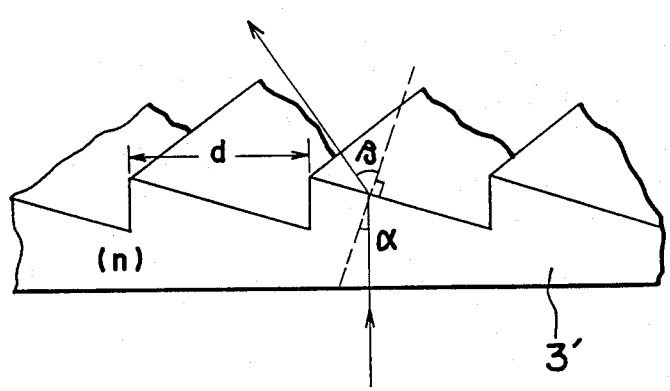
FIG. 7 is a fragmentary perspective view showing on an enlarged scale, part of a diffraction grating of FIG. 6.

As shown on an enlarged scale in FIG. 7, the diffraction grating 3' in FIG. 6 has its one surface formed into a saw-tooth shape. This shape is intended to cause the direction of the refracted light from the teeth to coincide with each other so as to blaze the light which has passed through the diffraction grating 3', thereby to concentrate energy in a direction of the diffraction. For the above purpose, the shape is so determined as to satisfy a following equation on the assumption that light is vertically incident upon the flat face side of the diffraction grating 3'.

$$n \sin\alpha = \sin\beta$$
$$d \sin(\beta-\alpha) = K\lambda$$

where n: refraction index of the diffraction grating 3'
 d: grating pitch
 $\lambda$: wavelength of light
 K: integral number By the employment of the diffraction grating 3' as described above, as shown in FIG. 6, the light emitted from a point D where the semi-conductor laser 7 is disposed, is diffracted by the diffraction grating 3' and forms light spots only at two points A and B on the recording medium 1. Of these two points, the reproducing signal by the light modulated at the point A of the recording medium 1 is the correct signal, and the reflected light is diffracted by the diffraction grating 3', and reaches a point F for the detector 6 and the point D for the semi-conductor laser 7. Meanwhile, the light based on the returning light modulated at a point B (on the other track) slightly spaced from the correct spot A and not subjected to diffraction by the diffraction grating 3' reaches a point E without the detector 6 and the point D where the semi-automatic laser 7 is disposed. Accordingly, only the returning light from the correct spot position A reaches the detector 6, and thus, an improved pick-up device free from influence of crosstalk and having favorable characteristics with a high efficiency for light utilization, may be presented.

As is clear from the foregoing description, according to the present invention, it is possible to produce a high performance pick-up device having a symmetrical nature, which is compact in size and light in weight.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. In an optical information storage system for reproducing information stored on a recording medium which modulates a light beam projected thereon, a pick-up device comprising:
 a light source directing light along a primary axis to said recording medium;
 first and second sensors arranged symmetrically with respect to said light source;
 a diffraction grating disposed between said recording medium and said first and second sensors;
 cylindrical lens means disposed between said diffraction grating and said first and second sensors for providing a focusing error signal to said sensor;
 said sensors being responsive to said focusing error signal for providing focusing and tracking information to facilitate the focusing and tracking of the light from said light source and said recording medium.

2. The device of claim 1, wherein said cylindrical lense means is arranged to allow unimpeded passage of light between said light source and said recording medium.

3. The device of claim 2, wherein said cylindrical lense means comprises first and second cylindrical lenses disposed between said diffraction grating and said first and second sensors, respectively.

* * * * *